Dec. 14, 1948.    R. E. J. NORDQUIST    2,455,944
EXPANDABLE TUNNEL FISH CANNING MACHINE

Filed May 20, 1946    3 Sheets-Sheet 1

INVENTOR.
Ronald E. J. Nordquist
BY Ivan D. Thornburgh
Charles H. Gene
ATTORNEYS

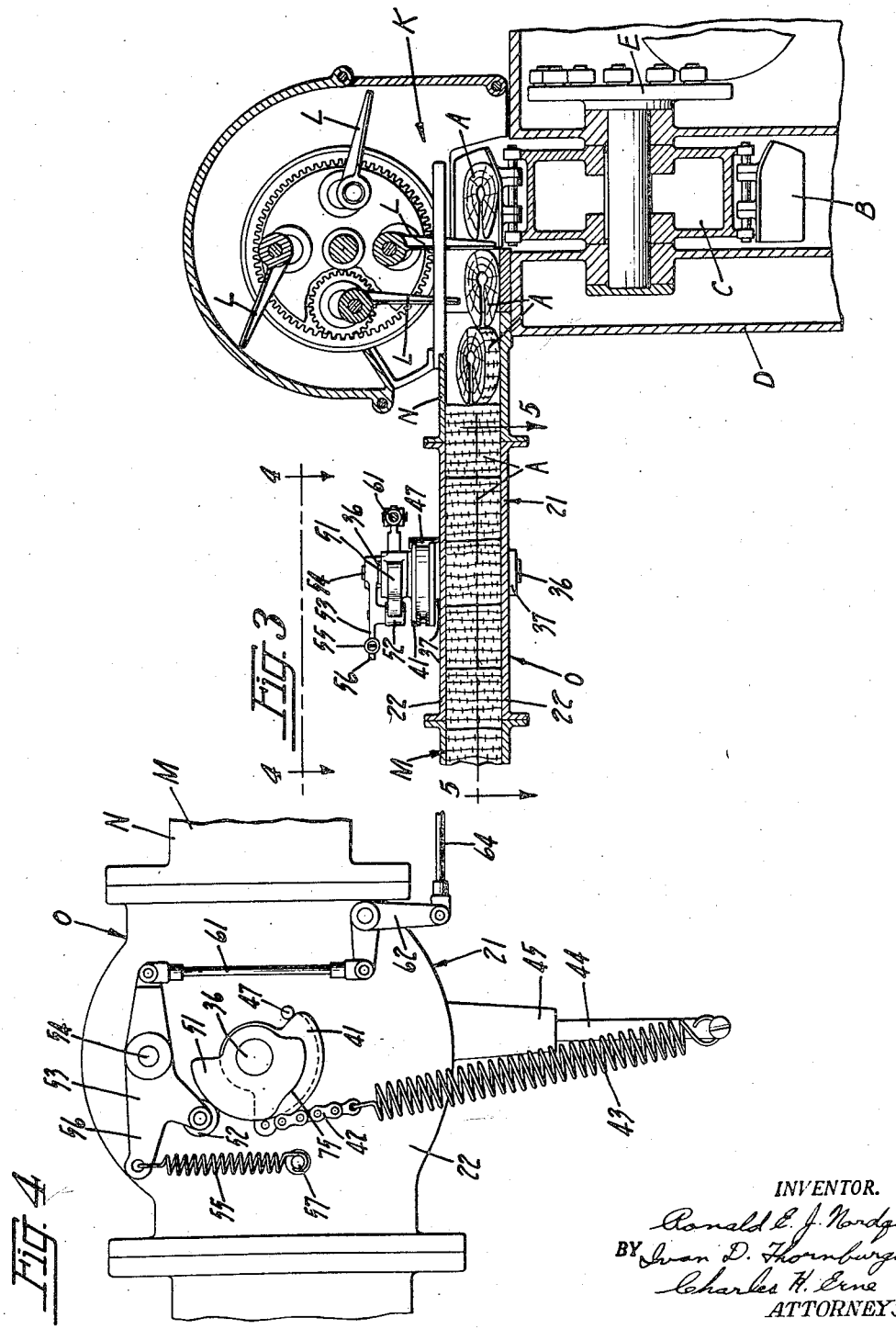

Dec. 14, 1948.       R. E. J. NORDQUIST       2,455,944
EXPANDABLE TUNNEL FISH CANNING MACHINE
Filed May 20, 1946                           3 Sheets-Sheet 3
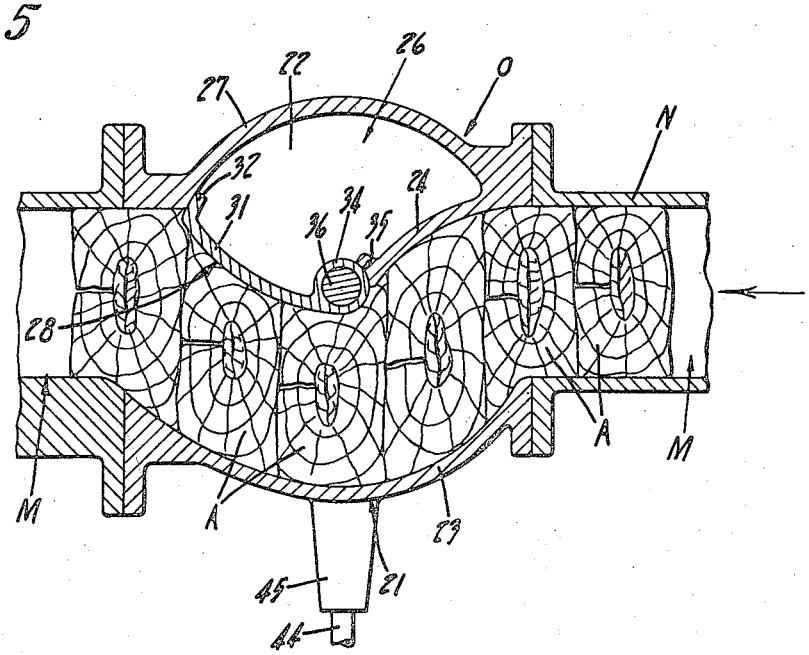
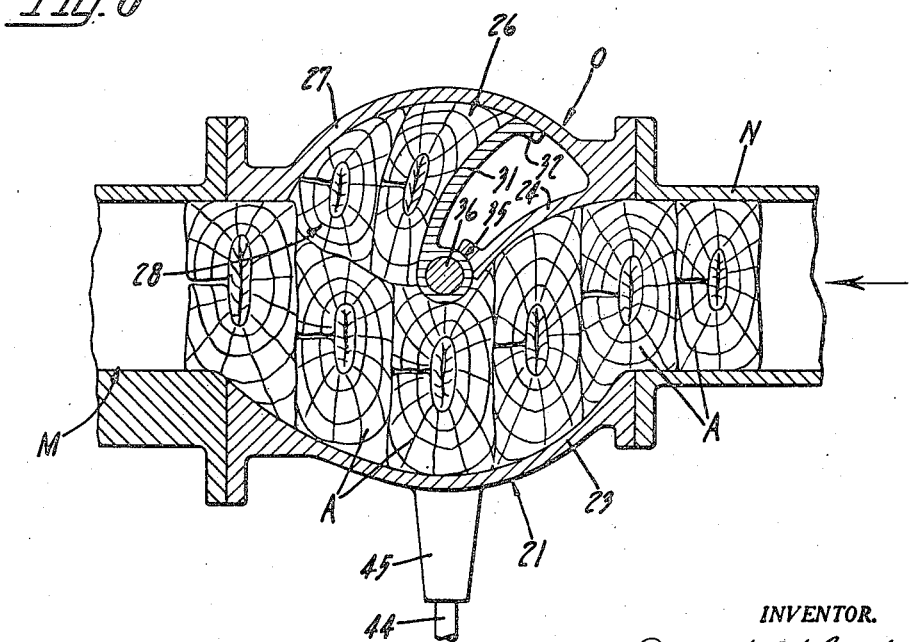
INVENTOR.
Ronald E. J. Nordquist
BY Ivan D. Thornburgh
Charles H. Erne
ATTORNEYS Patented Dec. 14, 1948

2,455,944

UNITED STATES PATENT OFFICE 2,455,944

EXPANDIBLE TUNNEL FISH CANNING MACHINE

Ronald E. J. Nordquist, Maplewood, N. J., assignor to American Can Company, New York, N. Y., a corporation of New Jersey Application May 20, 1946, Serial No. 670,939

6 Claims. (Cl. 198—37)

The present invention relates to a fish canning machine and has particular reference to an improved pressure control mechanism for compensating for an excessive accumulation of fish passing through the machine.

An object of the invention is the provision of a fish canning machine having a supply tunnel through which cut pieces of fish advance for delivery to a canning mechanism wherein the volume of the tunnel may be temporarily increased to compensate for an excessive accumulation of fish therein.

Another object is the provision of such a fish canning machine wherein the increase in volume of the tunnel is utilized to control the operation of the machine so that the fish mass passing through the machine may be maintained in as nearly a uniformly packed condition as possible.

Another object is the provision of such a fish canning machine wherein a predetermined reserve supply of fish is permitted to collect before the machine control becomes effective so that this reserve may be utilized to maintain the uniformly packed condition of the fish immediately upon the relieving of a congested condition in the machine and during the time the machine is returning to normal operation after being adjusted for the congested condition.

Another object is the provision of such a machine wherein a portion of the supply tunnel is made yieldable for controlling the fish feeding devices so that any undue pressure brought about by an excessive accumulation of fish in the tunnel will immediately reduce the feeding action until normal pressure conditions in the tunnel obtain.

Numerous other objects and advantages of the invention will be apparent as it is better understood from the following description, which, taken in connection with the accompanying drawings, discloses a preferred embodiment thereof.

Referring to the drawings:

Fig. 3 is a view similar to Fig. 1 showing the fish feed-in devices and the supply tunnel, with parts broken away;

Fig. 4 is a top plan view on a larger scale, and taken substantially along a plane indicated by the line 4—4 in Fig. 3, with parts broken away;

Fig. 5 is an enlarged horizontal section taken substantially along the line 5—5 in Fig. 3, with parts broken away; and Fig. 6 is a view similar to Fig. 5 showing certain movable parts in a different position.

Figure 1:
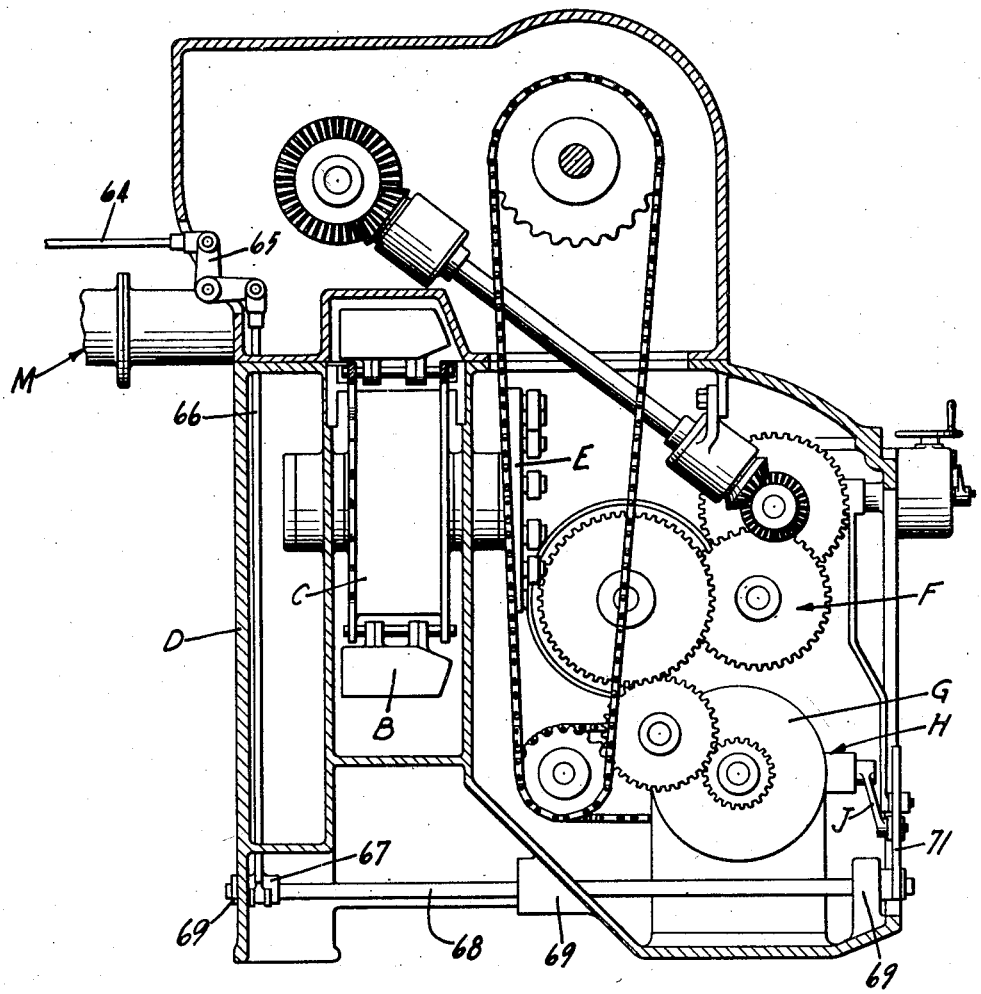
Figure 1 is a vertical sectional view through the feed-in end of a fish canning machine embodying the instant invention, with parts broken away.

As a preferred embodiment of the instant invention the drawings illustrate an improved pressure control mechanism for compensating for an excessive accumulation of cut pieces of fish fed into the forward end of a fish canning machine of the type disclosed in United States Patent 2,226,019, issued December 24, 1940, to W. E. Rooney, on Fish canning machine. Principal parts of this machine are shown in the drawings.

In the machine, fish pieces A (Fig. 3) previously cut to a desired can length are fed or advanced into the machine on an endless chain conveyor B having upper and lower runs disposed in horizontal position, such a conveyor being situated adjacent the front of the machine, as clearly shown in the Rooney patent above mentioned. The conveyor operates over a pair of spaced sprockets C carried on shafts journaled in bearings formed in a frame D which constitutes the main frame of the machine (see also Fig. 1).

The conveyor B is actuated in an intermittent or step-by-step manner by a cam operated indexing device E mounted on one of the shafts of the conveyor sprockets C. This indexing device and its operating cam are rotated through a train of meshing gears, generally indicated by the letter F. The gears of this train are continuously rotated by a variable speed power unit G such as an "oil gear" or the like mechanism, mounted in the base of the main frame D. This unit is controlled by a valve H housed in the unit and operated by a valve lever J.

The conveyor B carries the cut pieces of fish to a discharge station K (Fig. 3). At this station the pieces of fish, as they enter the station, are swept off the conveyor sidewise by a plurality of discharge forks L which continuously move along a path of travel extending transversely of the conveyor. These forks are mounted on a rotating disk disposed in the main frame D and actuated through a gear connection with the gear train F.

The discharged pieces of fish A are received in a supply tunnel M, the entrance end of which is located at the discharge station K. The fish are gently swept into the tunnel by the discharge forks L and are compressed by these forks against other previously fed fish pieces already in the tunnel. This provides a uniform fish mass which serves as the supply from which the fish is taken in measured charges by auxiliary feeding devices for packing into cans, as mentioned in the Rooney patent above.

The compression of the fish pieces by the forks L feeds the fish mass through the tunnel toward its discharge end. During this travel of the fish, it is turned from a flat position into a vertical position to facilitate packing into the cans. This turning of the fish is brought about by a twisted section N of the tunnel, this section being located adjacent the entrance end of the tunnel.

The use of such a twisted tunnel section for the purpose of turning fish passed therethrough is old in the art and in the present invention is merely incidental. For example see the W. E. Rooney Patent 2,044,813—page 5, column 1, line 58 and Figs. 1, 33 and 40. In view of this it is believed that more detailed illustration is unnecessary.

Due to variations in the size of the fish pieces A entering the machine by way of the conveyor B, an excessive accumulation of fish occasionally obtains in the tunnel and thus builds up a pressure which interferes with proper feeding of the fish. In the present invention such an abnormal condition is immediately relieved by a pressure control mechanism O which is connected with the variable speed power unit G. This control mechanism slows down or if desired momentarily stops all effective output of the power unit and hence stops further feeding of fish into the tunnel M until the pressure conditions within the tunnel have returned to normal. This is brought about by the continued operation of the auxiliary feeding devices located at the discharge end of the tunnel. It is to this control mechanism that the invention is particularly directed.

The pressure control mechanism O includes a housing 21 (Figs. 3, 4, 5 and 6) which is disposed intermediate the twisted entrance section N and the discharge section of the tunnel M. The housing includes substantially flat top and bottom parallel walls 22 and a pair of curved spaced side walls 23, 24 which form a part of the tunnel M and which confine the fish mass as it is fed through the tunnel.

Adjacent the curved side wall 24 the housing 21 is formed with a reservoir 26 which is defined by the top and bottom walls 22 of the housing and by an outer curved side wall 27. This reservoir communicates with that portion of the tunnel M that extends through the housing 21 by way of an entrance opening 28 formed in the inner wall 24. This opening is normally closed by a movable hinge gate 31 which forms an extension of the inner side wall 24 of the housing.

One end of the gate 31 is formed with a sealing pad 32 which engages against and rides along the inner surface of the reservoir curved wall 27 when the gate moves. The opposite end of the gate is formed with a vertical hub 34 which fits within a sealing socket 35 provided on the inner housing wall 24. The hub is mounted on a vertical pivot rod 36 which is carried in bearings 37 (Fig. 3) formed in the top and bottom walls 22 of the housing. The pivot rod 36 extends above the top wall of the housing and carries a spring segment 41 (Fig. 4).

The segment 41 carries one end of a short link chain 42. The opposite end of the chain is secured to a tension spring 43. The outer end of the spring is hooked over a support rod 44 carried in a boss 45 on the outer side wall 23 of the housing. The outer periphery of the segment is grooved to accommodate the short length of chain 42. The spring 43 holds the segment 41 against a stop pin 47 (Fig. 4) carried in the top wall 22 of the housing. This holds the gate 31 under spring tension in its normal position, as shown in Fig. 5.

In its normal position the gate 31 guides the fish mass through the tunnel M toward its discharge end and thus prevents the fish from entering the reservoir 26. However, when an excessive amount of fish accumulates in the tunnel under normal operation of the feeding devices C and L, an abnormal pressure is built up in the fish mass. When this pressure is sufficient to overcome the tension in the spring 43, it swings the gate 31 back into the reservoir 26, as best shown in Fig. 6, the gate hinging on its pivot rod 36. This yielding movement of the gate permits the fish mass to expand into the reservoir and this relieves the excessive pressure.

The inward yielding movement of the gate 31 operates to control the power unit G by slowing it down to a speed below normal or by momentarily stopping the unit, as hereinbefore mentioned. However, this control does not become effective until a predetermined amount of fish, as for example enough fish to fill one can, is stored in the reservoir as a reserve supply to be used immediately upon relieving the excessive congestion in the tunnel. This reserve supply is used during the time the operation of the feeding devices are returning to normal feeding speed and thus avoids slack filling of the cans during this period.

This control of the power unit G by the hinge gate 31 is effected by an edge cam 51 (Figs. 3 and 4) which is mounted on the upper end of the gate pivot rod 36 just above the spring segment 41. The cam operates against a cam roller 52 carried on a lever 53 mounted on a pivot stud 54 secured in the top wall 22 of the housing 21. A spring 55 having one end secured to an arm 56 of the lever and having its opposite end fastened to a pin 57 secured in the top wall 22 of the housing keeps the cam roller 52 in engagement with the cam 51.

The opposite end of the lever 53 is connected by a link 61 to a bell crank 62 pivotally mounted on the housing 21. The bell crank is also connected by a link 64 (see also Fig. 1) to an auxiliary bell crank 65 which is pivotally mounted on the main frame D. This auxiliary bell crank is connected by a rod 66 to an arm 67 mounted on an actuating shaft 68 carried in bearings 69 formed in the base of the main frame.

Figure 2:
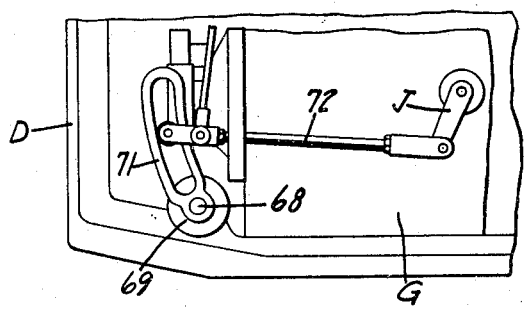
Fig. 2 is a front elevation detail of a part of the right side of the machine shown in Fig. 1, with parts broken away.

The actuating shaft 68 carries a curved slotted arm 71 (see also Fig. 2) which operates a link 72 connecting with the valve actuating lever J of the power unit G. The rod 66, shaft 68, slotted arm 71 and their connection with the valve actuating lever J are similar to those disclosed and fully explained in the above mentioned Rooney patent. In some cases the power unit G is controlled by a remotely disposed valve and in such cases the cam lever 53 may be directly connected with this valve.

When the hinge gate 31 upon moving into the reservoir 26 under pressure of the fish mass has yielded sufficient to admit the predetermined reserve supply of fish into the reservoir, as hereinbefore mentioned, a reduced diameter portion 75 (Fig. 4) of the cam 51 on the gate pivot rod 36 comes adjacent the cam roller 52 and thus permits the spring 55 to rock the cam lever 53. It is this rocking of the cam lever that actuates the link and lever system connecting with the valve lever J of the power unit G that shifts the lever J and thus retards or momentarily stops the power unit to control the rate of speed of the feeding devices C and L.

While the feeding devices C and L are operating at this reduced speed or are momentarily idle, the fish mass at the discharge end of the tunnel M continues to be fed forward by the auxiliary feeding devices as mentioned hereinbefore. It is this continued feeding at the discharge end of the tunnel that relieves the congestion in the tunnel and thereby reduces the pressure therein. With a given reduction of pressure in the tunnel, the tension spring 43 pulls the gate back into its normal position as shown in Fig. 5.

In moving back into its normal position the gate 31 rotates the cam 51 in a reverse direction and hence rocks the cam lever 53 into its original position. This actuates the valve lever J to return the power unit G to normal speed and hence returns the feeding devices C and L to normal feeding operations. At the same time, the gate 31 in moving back into its normal position, gradually pushes the reserve supply of fish out of the reservoir 26 and into the tunnel M. This reserve mass is fed forward with the main fish mass already in the tunnel to the discharge end of the tunnel. It is this reserve supply of fish that maintains the uniform feeding condition for the fish mass while the feeding devices are returning to normal operation.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a fish canning machine, the combination of a supply tunnel for confining cut pieces of fish, feeding devices for advancing the pieces of fish through said tunnel, collecting means adjacent said tunnel for collecting a predetermined reserve supply of fish under pressure of an excessive accumulation of fish in the tunnel, yieldable means forming a portion of said tunnel for directing the excess fish into said collecting means, and elements operable by said yieldable means and with an action delayed until said predetermined reserve supply of fish has been fully collected in said collecting means for retarding the action of said feeding devices until the excessive accumulation of fish in said tunnel has been relieved.

2. In a fish canning machine, the combination of a supply tunnel for confining cut pieces of fish advancing therethrough for delivery to a canning mechanism said tunnel having flat top and bottom walls and curved side walls, feeding devices for feeding the cut pieces of fish into said tunnel, and a pivotally mounted gate forming a curved portion of one side wall of said tunnel and movable between said top and bottom walls for temporarily increasing the volume of the tunnel to compensate for an excessive accumulation of fish passing into the tunnel.

3. In a fish canning machine, the combination of a supply tunnel for confining cut pieces of fish advancing therethrough for delivery to a canning mechanism said tunnel having flat top and bottom walls and curved side walls, feeding devices for feeding the cut pieces of fish into said tunnel, a pivotally mounted gate for forming a curved portion of one side wall of said tunnel and movable between said top and bottom walls for temporarily increasing the volume of the tunnel to compensate for an excessive accumulation of fish passing through the tunnel, and elements operable by said pivotally mounted gate when moved to increase the volume of the tunnel for controlling the operation of said feeding devices to regulate the quantity of fish fed into said tunnel.

4. In a fish canning machine, the combination of a supply tunnel for confining cut pieces of fish, feeding devices for advancing the pieces of fish through said tunnel, a reservoir adjacent said tunnel for collecting a predetermined reserve supply of fish under pressure of an excessive accumulation of fish in the tunnel, a gate interposed between said tunnel and said reservoir and movable into said reservoir under pressure of the excessive accumulation of fish in said tunnel, elements adjacent said gate for retarding the action of said feeding devices until the excessive accumulation of fish in said tunnel has been relieved, and means operable by said gate for actuating said elements after said predetermined reserve supply of fish has been collected in said reservoir.

5. In a fish canning machine, the combination of a supply tunnel for confining cut pieces of fish, feeding devices for advancing the pieces of fish through said tunnel, a reservoir adjacent said tunnel for collecting a predetermined reserve supply of fish under pressure of an excessive accumulation of fish in the tunnel, a gate interposed between said tunnel and said reservoir and movable into said reservoir under pressure of the excessive accumulation of fish in said tunnel, a pivot rod rotatable with said gate, elements adjacent said gate for retarding the action of said feeding devices until the excessive accumulation of fish in said tunnel has been relieved, and a cam mounted on said pivot rod and operable by said gate for actuating said elements after said predetermined reserve supply of fish has been collected in said reservoir.

6. In a fish canning machine, the combination of a supply tunnel for confining cut pieces of fish, feeding devices for advancing the pieces of fish through said tunnel, a reservoir adjacent said tunnel for collecting a predetermined reserve supply of fish under pressure of an excessive accumulation of fish in the tunnel, a gate interposed between said tunnel and said reservoir and movable into said reservoir under pressure of the excessive accumulation of fish in said tunnel, elements adjacent said gate for retarding the action of said feeding devices until the excessive accumulation of fish in said tunnel has been relieved, means operable by said gate for actuating said elements after said predetermined reserve supply of fish has been collected in said reservoir, and means operable upon relieving of the congestion in said tunnel for feeding said reserve supply of fish back into said tunnel gradually and while the feeding devices are returning to normal feeding operation.

RONALD E. J. NORDQUIST.

REFERENCES CITED

The following references are of record in the file of this patent:

UNITED STATES PATENTS

| Number | Name | Date |
|---|---|---|
| 1,358,255 | Seufer et al. | Nov. 9, 1920 |
| 1,366,434 | Thomson | Jan. 25, 1921 |
| 2,422,198 | Jakob | June 17, 1947 |